United States Patent [19]

Brugman

[11] Patent Number: 4,649,452
[45] Date of Patent: Mar. 10, 1987

[54] DISKETTE CLIP

[76] Inventor: William H. Brugman, 317 Busch St., Muscatine, Iowa 52761

[21] Appl. No.: 746,697

[22] Filed: Jun. 20, 1985

[51] Int. Cl.$^4$ .............................................. G11B 23/04
[52] U.S. Cl. ...................................... 360/133; 360/60
[58] Field of Search ........................ 360/133, 132, 60

[56] References Cited

U.S. PATENT DOCUMENTS 3,950,786  4/1976  Shapley ................................ 360/132
4,460,930  7/1984  Takahashi ............................ 360/60

OTHER PUBLICATIONS

Lee, "Reusable . . . Diskette", IBM Tech. Disc. Bull., vol. 26, No. 8, Jan. 1984, p. 4113.

Primary Examiner—Robert S. Tupper
Attorney, Agent, or Firm—Henderson & Sturm

[57] ABSTRACT

Disclosed is an erasure-prevention clip for use with an information disk or diskette assembly of the type comprising a jacket or envelope containing a magnetic diskette. Conventionally, the jacket, which is typically square, has in one edge thereof a notch which is covered by some removable tab to prevent erasure of recorded data; e.g., tape or the like, which, after removal, leaves the notch exposed and therefore subjects the diskette to possible erasure of the material previously recorded thereon. The present invention provides a notch-closing clip in the form of a U-shaped member having a bight dimensioned to fit the notch and a pair of legs closely spaced apart to receive the jacket and dimensioned to overlie relatively broad areas of opposite faces of the jacket that border the notch. The legs converge away from the bight so as to increase their grip on the jacket. The clip is of opaque material and is designed primarily for soft or so-called floppy disks of the five-inch size and having the notch in that edge that is parallel to the line of movement of the jacket into and out of the disk drive.

2 Claims, 8 Drawing Figures

U.S. Patent   Mar. 10, 1987   4,649,452
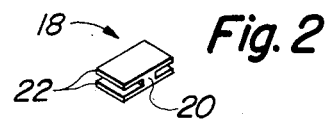
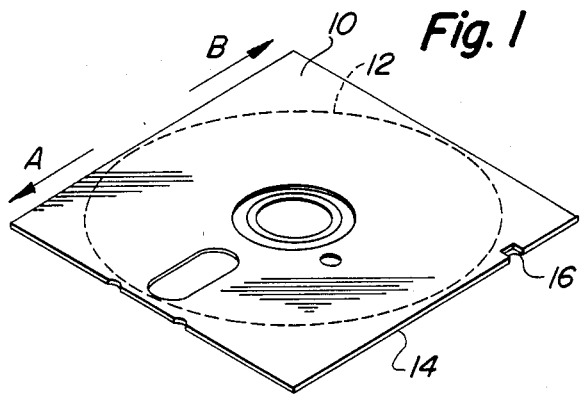
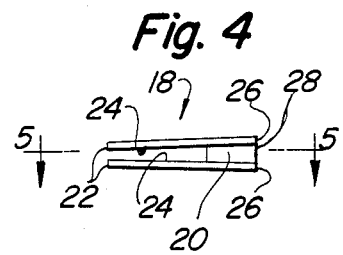
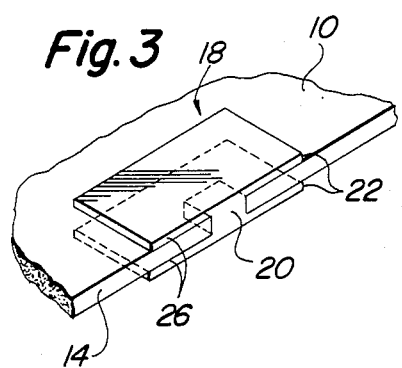
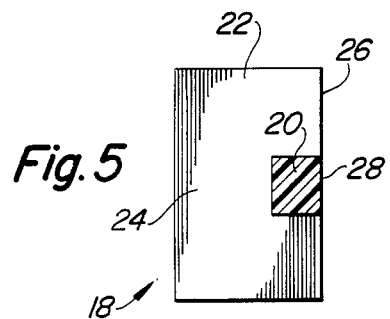
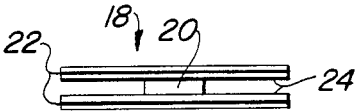
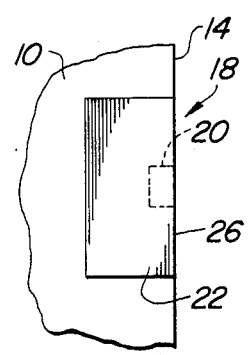
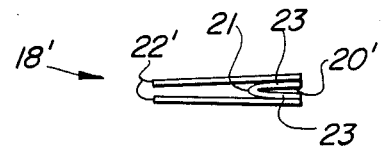

DISKETTE CLIP

BACKGROUND AND SUMMARY OF THE INVENTION

Magnetic information media are of course well known in the information storage and retrieval art and take many forms, typical of which are tape cartridges, hard and soft disks or diskettes, etc. In almost all cases, openings of one form or another are provided in the tape or disk container as incidents to certain functions in recording, playback, erasure, etc. Representative of these are the disclosures in U.S. Pat. Nos. 3,950,786 to Shapley and 4,460,930 to Takahashi. Nevertheless, those disclosures do not reveal a solution to the present problem, nor do they suggest, alone or together, an obvious way to adapt either patented means to the present diskette. The earlier patent refers to a tape and cartridge and thus is dimensionally as well as functionally inadequate. The later patent, although involving a disk, is totally structurally different and does not teach in applicant's direction.

According to the present invention, a simple and inexpensive erasure-prevention clip is provided as an element separate from the diskette and jacket; i.e., unlike some examples of the prior art, the clip is not an original portion broken off from and then replaced in or on the jacket. It is a feature of the invention that the clip may be easily manufactured of one-piece material, preferably of a suitable plastic such as polyvinylchloride impervious to light. The clip is a U-shaped member having a bight dimensioned to fit the notch, which is essentially "square" (except of course it is open at one side at the jacket edge in which it is formed) and the bight is therefore square. The legs of the member extend coextensively from the bight but are of greater area than that of the cross-section of the bight and thus overlie relatively broad notch-bordering areas at opposite sides or faces of the jacket, thus completely masking the notch from the entrance of light. It is significant that the legs are flexible and convergent away from the bight so as to increase the frictional grip thereof on the jacket.

It is a still further feature, in a modified form of clip, that the bight is itself made flexible in the form of a biased hinge, primarily by being folded on a line parallel to that edge of the disk jacket to which the clip is applied, thus making it easier to apply and remove the clip.

These and further features of the invention will become apparent as a preferred embodiment of the invention is disclosed in detail in the ensuing description and accompanying sheet of drawings.

DESCRIPTION OF THE DRAWINGS

FIG. 1 is a perspective of a typical diskette-jacket assembly to which the invention is applicable.

FIG. 2 is a perspective, on the scale of FIG. 1, showing the clip.

FIG. 3 is an enlarged fragmentary perspective showing the clip in use.

FIG. 4 is an end view of the clip by itself.

FIG. 5 is a section on the line 5—5 of FIG. 4.

FIG. 6 is a side view of the clip.

FIG. 7 is a plan of the clip in use.

FIG. 8 is an end view of a modified form of clip.

DETAILED DESCRIPTION OF A PREFERRED EMBODIMENT OF THE INVENTION

Reference will be had first to FIG. 1 for an illustration and description of a typical diskette and jacket assembly comprising a jacket (10) containing a diskette (12), here a five-inch "floppy" type. This jacket is essentially square and has in one edge (14) a notch (16) which is itself square except that it is open at its outer side or side away from the jacket. The assembly is inserted into a typical disk drive (not shown) in the direction of the arrow A and is withdrawn in the opposite direction B. The line of insertion and withdrawal is parallel of course to the opposite jacket edge (14).

The purpose of the notch will be clear to those versed in the art and needs no elaboration. Suffice it to note that it is required at times that this notch be closed and uncovered, as the case may be. The means for accomplishing closure and exposure should be simple, foolproof, inexpensive and easily replaced in the event of loss. The present means meets these and other requirements.

The form of clip shown in FIGS. 1 through 7 is designated as a whole by the numeral (18) and is of U-shaped configuration in section, having a bight (20) and a pair of legs (22). The clip per se maybe of one-piece molded or equivalent construction, it being noted that the bight and legs are affixed to each other. The material of which the clip is made is opaque, preferably plastic of polyvinylchloride or the like, since its purpose is to block the transmission of light when the clip is installed or applied on the jacket (FIG. 3). The cross-section of the bight is such that it closely fits the jacket notch (16), thus filling the notch. Each leg is flat and has at least an inner face (24) of substantially greater area than the cross-section of the bight, whereby to overlie a substantial area of the jacket that borders the notch. As a matter of convenience in manufacture and use, the legs are preferably identical and thus overlie correspondingly relative large areas at opposite sides of the jacket, thus again insuring against the leakage of light at the notch (16). As best seen in FIG. 4, the legs converge away from the bight from a spacing at the notch on the order of the thickness of the edge of the jacket and, being flexible, include a bias toward each other so as to improve the frictional grip thereof on the jacket and thus to minimize the possibility that the clip can be dislodged in a direction cross-wise of the line of insertion and withdrawal of the jacket (arrows A and B). Since the bight fills the notch, the clip cannot be dislodged along a line parallel to this line.

The outer edges of the clip, denoted (26) are here coincident with the outer limit (28) of the bight (20) and thus, when the clip is installed on the jacket, lie along or at least do not extend over or beyond the proximate jacket edge (16) and therefore do not present any hindrance to easy insertion and withdrawal of the jacket.

In the modified form of clip shown in FIG. 8 and denoted at (18'), the bight (20') is a flexible hinge element having a fold line (21) providing a pair of leaves (23) affixed respectively to legs (22'), which have the characteristics of those described before. The bias in the bight (20') is such that the leaves, and thus the legs, tend to move apart at the right (as seen in FIG. 8) of the fold line, meaning that the legs to the left of the fold line are biased together like a clamp. In use, the legs may be squeezed between one's finger and thumb to the right of the fold line, thus opening the legs at their inner portions to facilitate application of the clip to the jacket. When the finger pressure is released, the legs grip the jacket. The bight of course otherwise has the size, etc. characteristics of the bight (20) in FIGS. 1-7.

The function of the clip is to prevent erroneous erasure during disk use; i.e., as long as the clip is in place, erasing information from the disk or adding information to the disk is not possible. It is possible, however, with the clip in place, to read information from the disk. The manner in which the clip cooperates with the jacket militates against loss of the clip, whether in use in a disk drive or in storage.

Features and advantages in addition to those pointed out will become apparent to those versed in the art, as will many modifications in the preferred embodiments disclosed, all without departure from the spirit and scope of the invention.

I claim:

1. For use with an information disk assembly of the type including a square jacket containing a disk and having in one edge thereof parallel to the line of movement of the assembly into and out of a disk drive a notch extending inwardly from and opening outwardly at the edge: an erasure-preventing clip, comprising a U-shaped member having a bight means dimensioned to fit the notch and a pair of relatively rigid legs joined to the bight means and extending inwardly therefrom, said legs respectively having inner flat faces spaced apart on the order of the thickness of the jacket, said faces respectively having areas substantially greater than that of the cross-section of the bight means so that in use the faces respectively overlie substantial notch-bordering areas of opposite sides of the jacket, the outer edges of the legs and bight means being aligned so as not to project beyond the aforesaid edge of the jacket when the clip is in place on the jacket, the bight means forming a biased hinge interconnecting the rigid legs for movement toward and away from each other, the bias in the hinge being such as to urge the legs toward each other so as to squeeze onto the jacket.

2. The clip of claim 1, the bight means is a folded element, folded along a line inwardly of and parallel to the outer limits of the notch to provide a pair of complementary leaves, one affixed to each leg, and said element being formed of flexible material biased to cause the inner portions of the legs to approach each other so as to squeeze onto the jacket.

* * * * *